UNITED STATES PATENT OFFICE.

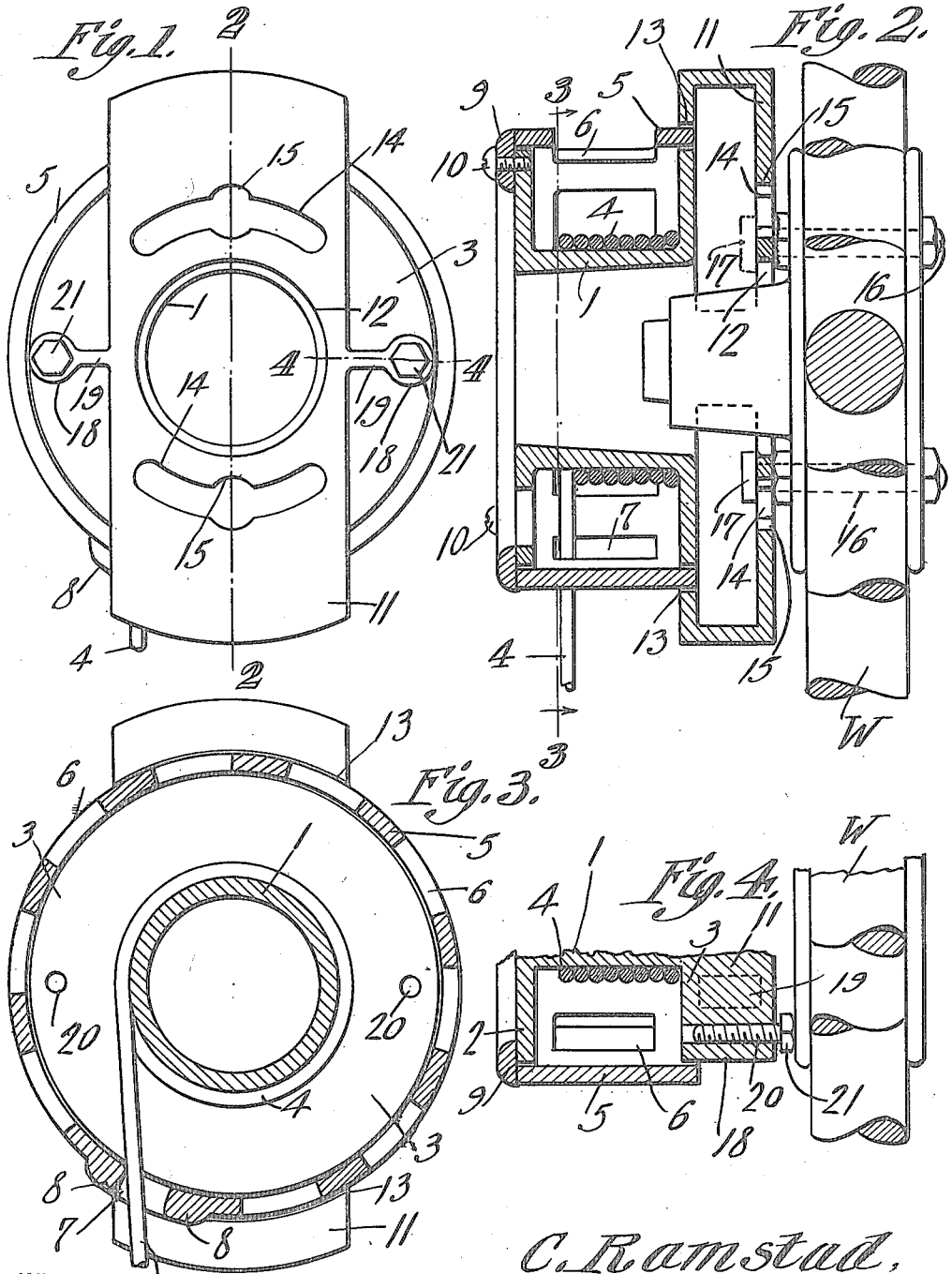

CHARLES RAMSTAD, OF OKMULGEE, OKLAHOMA.

AUTOMOBILE-PULLING ATTACHMENT.

1,207,793.                Specification of Letters Patent.        Patented Dec. 12, 1916.

Application filed May 25, 1916. Serial No. 99,883.

*To all whom it may concern:*

Be it known that I, CHARLES RAMSTAD, a citizen of the United States, residing at Okmulgee, in the county of Okmulgee and State of Oklahoma, have invented a new and useful Automobile-Pulling Attachment, of which the following is a specification.

The present invention is an automobile pulling attachment, and aims to provide a novel and improved attachment for the rear wheel of an automobile to enable the machine to extricate itself from a mud hole or rut.

It is the object of the invention to provide a device of the nature indicated embodying a reel for winding up a cable or other flexible element, novel means for attaching said reel to the rear wheel of an automobile, and novel means for protecting the reel and preventing the cable from falling therefrom.

It is also within the scope of the invention to provide an automobile pulling attachment which is simple, compact and inexpensive in construction, and which is thoroughly practical and efficacious for its intended purpose.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a rear view of the device. Fig. 2 is a diametrical section taken on the line 2—2 of Fig. 1, showing the device applied to the hub of the rear wheel. Fig. 3 is a section taken on the line 3—3 of Fig. 2. Fig. 4 is a sectional detail taken on the line 4—4 of Fig. 1.

The device includes a tubular or sleeve-shaped reel or drum 1 provided at its outer end with an outturned flange 2 and at its inner or rear end with an outturned flange 3. A cable, cord, or other flexible element 4 is attached to and adapted to be wound upon the reel 1 between the flanges 2 and 3 within an annular guard 5 mounted rotatably upon the edges of the flanges 2 and 3 and preferably provided with openings 6 to enable the cable to be seen when wound upon the reel.

The guard 5 has an opening 7 through which the cable 4 extends, and said guard 5 has a rounded or curved portion 8 surrounding the opening 7 past which the cable can move with minimum friction. The guard 5 is held in place by means of a ring 9 attached to the edge portion of the flange 2 upon the outer face thereof and projecting from the edge of said flange so as to overlap the outer edge of the guard 5, as seen in Fig. 2. Said ring 9 is removably attached to the flange 2 by means of screws 10 or other suitable securing means, whereby when the ring 9 is removed, the guard 5 can be slipped off of the flanges of the reel. When the cable is wound upon the reel 1 within the guard 5, the guard prevents the cable from dangling loosely from the reel, and therefore prevents the cable from unwinding, when the attachment is left in place upon the rear wheel during the operation of the automobile. The guard 5 also holds the cable upon the reel when the device is detached and stored within the tool kit or other receptacle.

The reel is provided with means for attaching it to the hub of one of the rear wheels W of an automobile, and to this end a rectangular relatively flat casing 11 is cast integral with the flange or plate 3, and the back of the casing 11 is provided with an opening 12, preferably of larger diameter than the opening of the reel 1, to receive the hub of the wheel, and said hub can also project into the reel 1. The front wall of the casing 11 is provided with arcuate slots 13 receiving the rear or inner edge of the guard 5, and the sides of said casing 11 limit the rearward or inward movement of the guard.

The inner or back wall of the casing 11 is provided at opposite sides of the opening 12 with arcuate slots 14 provided between their ends with enlargements 15. These slots 14 are for the engagement of two diametrically opposite hub bolts 16 of the wheel W, which have their outer ends protruding and provided with heads 17, as seen in Fig. 2. Thus, in applying the device to the wheel W, the casing 11 is so positioned that the heads 17 can pass through the enlargements 15 of the slots 14, and then by turning the casing 11 in the proper direction, the slots 14 receive the bolts 16, and the heads 17 engage behind the back wall of the casing 11 to hold the casing in place adjacent the hub.

As a means for firmly holding the casing 11, adjacent the hub when it is applied thereto, the flange 3 has a pair of inwardly or rearwardly projecting studs 18 preferably connected with the side walls of the casing 11 by webs 19, said studs 18 being disposed at opposite sides of the casing 11 as seen in Fig. 1. Jam screws 20 are threaded within the studs 18 and have heads 21 to bear against the hub structure of the wheel W. Thus, when the casing 11 is engaged with the bolts 16, the screws 20 can be rotated to force them rearwardly or inwardly against the hub structure, and when the heads 21 bear against the hub structure, and the screws are rotated further, they will force the casing 11 outwardly, thus causing it to bear tightly against the heads 17, to hold the parts in fixed position.

From the foregoing, taken in connection with the drawings, it will be noted that the device can be readily applied to and detached from the rear wheel W of an automobile. In use, supposing the device to be properly attached to the wheel, the cable 4 is anchored in any suitable manner in advance of the rear wheel, the cable being unwound before the reel is applied to the rear wheel, and then when the rear wheel is rotated by the engine, the cable will be wound upon the reel 1, thus compelling the reel and wheel to move forwardly, whereby the wheel will be extricated from the mud hold or rut. The guard 5 can remain stationary, while the reel rotates, since the guard 5 will be prevented from rotating due to the fact that the cable 4 extends through the opening 7 of the guard.

Having thus described the invention, what is claimed as new is:

1. An automobile pulling attachment comprising a reel having flanges, means for attaching the reel to the rear wheel of an automobile, a guard mounted loosely upon the edges of said flanges and having an opening for the passage of a cable connected to and wound upon the wheel and means carried by one flange for holding the guard on said flanges.

2. An automobile pulling attachment comprising a reel having outturned flanges at its ends, a guard mounted loosely upon the edges of said flanges and having an opening for the passage of a cable connected to and wound upon said reel, one flange having means for attaching it to the rear wheel of an automobile, and a ring detachably secured to the other flange and extending therefrom to hold the guard upon the flanges.

3. An automobile pulling attachment embodying a tubular reel having flanges at its ends, one flange having an elongated relatively-flat casing provided with an opening, said opening and reel being adapted to receive the hub of a rear wheel of an automobile, said casing having arcuate slots at opposite sides of said opening for the engagement of headed members carried by said wheel, said slots having enlargements between their ends, said flange having studs at opposite sides of said casing, and jam screws threaded into said studs to bear against the wheel and force said casing away from it.

In testimony that I claim the foregoing as my own, I have hereto affixed my signature in the presence of two witnesses.

CHARLES RAMSTAD.

Witnesses:
J. R. VALLENTINE,
JAMES CURTNER.